(12) United States Patent
Commarford et al.

(10) Patent No.: US 8,121,585 B2
(45) Date of Patent: Feb. 21, 2012

(54) TECHNIQUE FOR SYNCHRONIZING DATA WITH A MOBILE DEVICE BASED ON A SYNCHRONIZATION CONTEXT

(75) Inventors: Patrick Commarford, Delray Beach, FL (US); David Lee Griffin, Raleigh, NC (US); Chris J. Martinez, Lake Worth, FL (US); Steven G. Woodward, Thousand Oaks, CA (US)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 11/467,380

(22) Filed: Aug. 25, 2006

(65) Prior Publication Data
US 2008/0049714 A1 Feb. 28, 2008

(51) Int. Cl.
*H04M 3/00* (2006.01)
(52) U.S. Cl. .......................................... 455/418; 705/41
(58) Field of Classification Search ........... 455/418–420
See application file for complete search history.

(56) References Cited

U.S. PATENT DOCUMENTS

| | | |
|---|---|---|
| 6,295,541 B1 | 9/2001 | Bodnar et al. |
| 6,694,146 B1 | 2/2004 | Hardin et al. |
| 2002/0069298 A1* | 6/2002 | Birkler et al. ................. 709/248 |
| 2003/0162555 A1* | 8/2003 | Loveland ....................... 455/502 |
| 2004/0187133 A1 | 9/2004 | Weisshaar et al. |
| 2004/0198468 A1 | 10/2004 | Patel et al. |
| 2004/0230747 A1* | 11/2004 | Ims et al. ....................... 711/133 |
| 2005/0044235 A1 | 2/2005 | Balahura et al. |
| 2005/0059421 A1 | 3/2005 | Reed et al. |
| 2005/0097225 A1 | 5/2005 | Glatt et al. |
| 2006/0010453 A1 | 1/2006 | Illowsky et al. |
| 2006/0073788 A1* | 4/2006 | Halkka et al. ................ 455/41.2 |
| 2006/0135143 A1* | 6/2006 | Suematsu ..................... 455/418 |

FOREIGN PATENT DOCUMENTS

| | | |
|---|---|---|
| EP | 1338968 A | 8/2003 |
| WO | WO03/083667 A | 10/2003 |

* cited by examiner

*Primary Examiner* — Marcos Batista
(74) *Attorney, Agent, or Firm* — Patents on Demand; Brian K. Buchheit; Scott M. Garrett (57) ABSTRACT

The present invention discloses a technique for a user to control a manner in which a data store of a mobile device synchronizes with a remotely located data store. More specifically, synchronization actions can be automatically executed by comparing combinations of user modifiable device settings against device-specific conditions. Device conditions can include device resources, timing parameters, and user-defined criteria, such as data priority, device location, and application-specific conditions. In one embodiment, the invention provides a means to override an application's existing synchronization rules. This permits synchronization for a device that includes multiple applications to be centrally and consistently handled, even when the applications normally lack synchronization control capabilities.

19 Claims, 4 Drawing Sheets

TECHNIQUE FOR SYNCHRONIZING DATA WITH A MOBILE DEVICE BASED ON A SYNCHRONIZATION CONTEXT

BACKGROUND

1. Field of the Invention

The present invention relates to the field of data synchronization and, more particularly, synchronizing data with a mobile device based on a synchronization context.

2. Description of the Related Art

Mobile devices are becoming an increasingly large part of business infrastructures. The flexibility provided by mobile devices allows employees to leave the shackles of a desk behind. Many of these mobile devices are as powerful as their desktop counterparts, capable of running a variety of enterprise software applications and contain an integrated storage space, such as flash memory or a hard drive that is synchronized with a centralized storage space. This allows the information entered by remote or roaming employees to be immediately integrated into corporate management information systems. The remotely located employees can also be immediately apprised of important information, which can be sent via a corporate information system and accessed in a relatively short time through their mobile device.

The synchronization of data on a mobile device with a centralized data store is not without inherent cost. For example, mobile device synchronization actions can be costly in terms of battery consumption and sometimes costly in terms of carrier charges. Some conventional solutions allow rudimentary synchronization control. For example, a user can be given an option not to synchronize a device when device battery levels fall below twenty five percent. A user can also be given an option to apply data filters when using an expensive connection. Current solutions lack an ability to control synchronization based upon a combination of criteria, such as a combination of battery level and connectivity conditions.

Further, conventional mobile devices lack of an overall mechanism that coordinates synchronization events of multiple applications running on the mobile device. Users are forced to establish synchronization rules for applications on a per-application basis. It would be preferable, if a user were permitted to create a set of rules that apply to all applications on the device, which is not possible with conventional technologies. Moreover, it would be useful if this desired capability could add synchronization control functionality for applications that do not have such functionality built into the application code itself. At present, user definable, synchronization control functionality is limited to some email applications and to some personal information management (PIM) applications.

SUMMARY OF THE INVENTION

The present invention discloses a technique for a user to control a manner in which a data store of a mobile device synchronizes with a remotely located data store. More specifically, synchronization actions can be automatically executed by comparing combinations of user modifiable device settings against device-specific conditions. Device conditions can include device resources, timing parameters, and user-defined criteria, such as data priority, device location, and application-specific conditions. In one embodiment, the invention provides a means to override an application's existing synchronization rules. This permits synchronization for a device that includes multiple applications to be centrally and consistently handled, even when the applications normally lack synchronization control capabilities.

The present invention can be implemented in accordance with numerous aspects consistent with material presented herein. For example, one aspect of the present invention can include a method for a mobile device to synchronize data. The method can begin with establishing at least one setting for the mobile device. One or more dynamic conditions of the device can be detected. The value of each dynamic condition can then be compared against a corresponding device setting. Based upon the results of these comparisons, a synchronization action can be initiated for the mobile device.

Another aspect of the present invention can include a mobile device that includes a data store, a user interface, a resource monitor, a condition engine, and a synchronization engine. The user interface can accept user inputs, which establish synchronization settings for the device. The resource monitor can determine the current values of the mobile device's resources. The condition engine can automatically determine the values of dynamic device conditions, which include device resource values. The synchronization engine can be configured to permit or deny synchronization based on the results of the comparisons between condition values and synchronization settings.

Yet another aspect of the present invention can include a graphical user interface for controlling mobile device synchronization. The interface can include an interface element for a user to specify at least one synchronization context for the mobile device. The synchronization context can include one or more settings and combinatory logic for the settings. Each setting can be automatically compared against a dynamic mobile device condition. The interface can also include a synchronization selection element that permits a user to specify at least one synchronization action that is to be automatically taken whenever the combinatory logic is satisfied.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
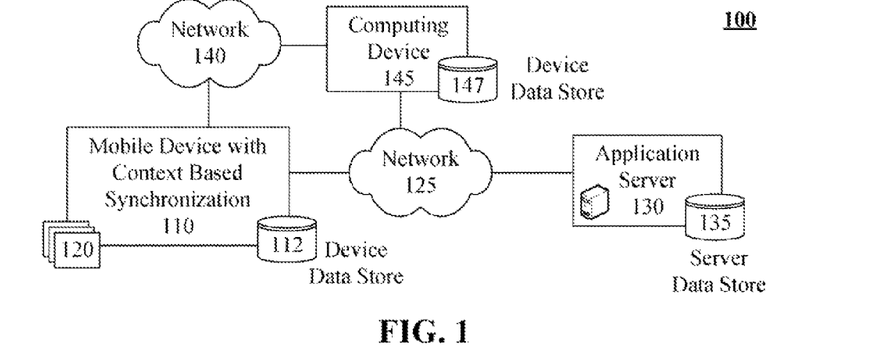
FIG. 1 is a schematic diagram illustrating a system for synchronizing mobile devices with remotely located data sources based upon user specified synchronization control settings in accordance with embodiments of the inventive arrangements disclosed herein.

FIG. 1 is a schematic diagram illustrating a system 100 for synchronizing mobile devices with remotely located data sources based upon user specified synchronization control settings. The synchronize control settings can be associated with dynamic device conditions, such as battery level, network connectivity, device location, and the like. Combinatory logic can be specified that is applied to the control settings and conditions to determine which, if any, synchronization actions are to be taken by the mobile device 110. The combinatory logic and user established settings are referred to as a context-of-use for the mobile device 110, or referred to as simply a synchronization context of the mobile device 110.

In system 100, synchronization actions involving mobile device 110 can include client-server based communications between device 110 and application server 130 conducted over network 125. For example, application server 130 can be an email server or Web server that exchanges digital content contained in server data store 135 with digital content contained in device data store 112. Synchronization actions between devices 110 and 130 can also be indirect data exchanges that utilize computing device 145 as a communication intermediary. For example, mobile device 110 can be docked (connected via network 140) to computing device 145, which is connected to server 130 via network 125. When device 145 is used as a communication intermediary, data store 147 can be used to cache digital content exchanged between device 110 and server 130.

Synchronization actions involving mobile device 110 can also include peer-to-peer communications between mobile device 110 and computing device 145 conducted over network 140, where digital content is exchanged between device data stores 112 and 147. For example, mobile device 110 can be communicatively connected to computing device 145 via a BLUETOOTH connection or a Wi-Fi connection, defined herein as a wireless connection conforming to any of the 802.11 family of protocols. In another situation, mobile device 110 can behave as a peripheral device of computing device 145, where when peripherally connected to device 145, the mobile device 110 can function as a storage drive of device 145.

As used herein, data synchronization can include any data exchange between a data store 112 of the mobile device and a remotely located data store, such as data store 135 and/or 147. Data exchanges can be time delayed or real-time, can be unidirectional or bidirectional and can include any type of digital content.

For example, synchronization actions of the mobile device 110 can include a conveyance of digital content, such as a conveyance of email messages, electronic documents, photographs, video, music, and the like. Further, data exchanges can include real-time communications, such as VoIP communications, chat communications, audio or video streaming communications, real-time collaborative communications, interactive gaming communications, and the like.

Regardless of how device 110 synchronizes with a remotely located data store, the mobile device 110 can include numerous components, which enable a user to establish synchronization control settings, to determine current dynamic conditions of the mobile device, and to automatically perform suitable synchronization actions based upon the conditions and the control settings.

It should be evident that performing a synchronization action can consume a resource of the mobile device 110. Resource consumption can be more significant when a resource is scarce, expensive, or difficult to renew. A mobile device 110 can include multiple different resources with overlapping capabilities. For example, a mobile device 110 can have multiple transceivers, such as a mobile telephony transceiver, a Wi-Fi transceiver, and a BLUETOOTH transceiver. Each of these transceivers can have different associated bandwidth characteristics, power consumption characteristics, and service fees. Synchronization context settings can alter synchronization details based upon these different transceiver characteristics and based upon which transceiver is to be involved in a data exchange.

Device 110 resources represent one of many contemplated synchronization conditions, which can affect synchronization behavior. Another type of condition that affects synchronization behavior can include application specific conditions. For example, if a user elects to open a collaboration document using a word processing application 120, it can be beneficial for the mobile device 110 to determine if any updates exist for the selected document and to update the document as necessary. Therefore, a selection made in the word processing application 120 results in an application condition that is relevant to a synchronization context. Similarly, selecting a send message option from an email application 120 can be a relevant condition for a synchronization context.

User definable synchronization settings can be established for applications 120, regardless of whether the individual applications 120 include application specific options for data synchronization. Synchronization settings established globally for device 110 can override application specific settings. For example, when an application 120 attempts to invoke a synchronization action, the attempted invocation can be considered a synchronization condition, which is compared against active synchronization contexts. The application's attempt to force the device 110 to synchronize does not necessarily result in a synchronization action occurring. Instead, an occurrence of a synchronization action can be dependent upon synchronization context settings.

In one embodiment, the mobile device 110 can be capable of multitasking. Multitasking can impose a strain on device 110 resources, which can affect synchronization actions defined by one or more synchronization contexts. For example, when a VoIP application 120 is actively engaged, a particular amount of bandwidth should be reserved for VoIP communications or quality degradation can occur. This limits an amount of available bandwidth for other synchronization purposes, which can be accounted for by user defined synchronization settings. Accordingly, application 120 reserved resources can be a relevant condition for determining whether a synchronization action should be taken.

Other conditions that can affect synchronization behavior can be based on factors external to the mobile device 110 itself, such as device location and data exchange urgency. For example, a location condition can indicate that a mobile device 110 is presently located at a workplace or is presently located at a user's home. When located at a workplace, synchronization settings can cause non-work related synchronization attempts (e.g., personal email exchanges) to have a relatively low priority, to be blocked, and/or to be delayed. In another example, a condition associated with an urgency level for digital content can affect synchronization behavior of the mobile device 110, where digital content with a high urgency level can be synchronized more frequently than digital content having a low urgency level.

As presented herein, data stores 112, 135, and 147, can be a physical or virtual storage space configured to store digital information. Data stores 112, 135, and 147 can be physically implemented within any type of hardware including, but not limited to, a magnetic disk, an optical disk, a semiconductor memory, a digitally encoded plastic memory, a holographic memory, or any other recording medium. Each of the data stores 112, 135, and 147 can be a stand-alone storage unit as well as a storage unit formed from a plurality of physical devices. Additionally, information can be stored within data store 112, 135, and 147 in a variety of manners. For example, information can be stored within a database structure or can be stored within one or more files of a file storage system, where each file may or may not be indexed for information searching purposes. Further, data stores 112, 135, and/or 147 can utilize one or more encryption mechanisms to protect stored information from unauthorized access.

Networks 125 and 140 can include any hardware/software/ and firmware necessary to convey digital content encoded within carrier waves. Digital content can be contained within analog or digital signals and conveyed though data or voice channels. Networks 125 and 140 can include local components and data pathways necessary for communications to be exchanged among computing device components and between integrated device components and peripheral devices. Networks 125 and 140 can also include network equipment, such as routers, data lines, hubs, and intermediary servers which together form a data network, such as the Internet. Networks 125 and 140 can also include circuit-based communication components and mobile communication components, such as telephony switches, modems, cellular communication towers, and the like. Networks 125 and 140 can include line based and/or wireless communication pathways.

Figure 2:
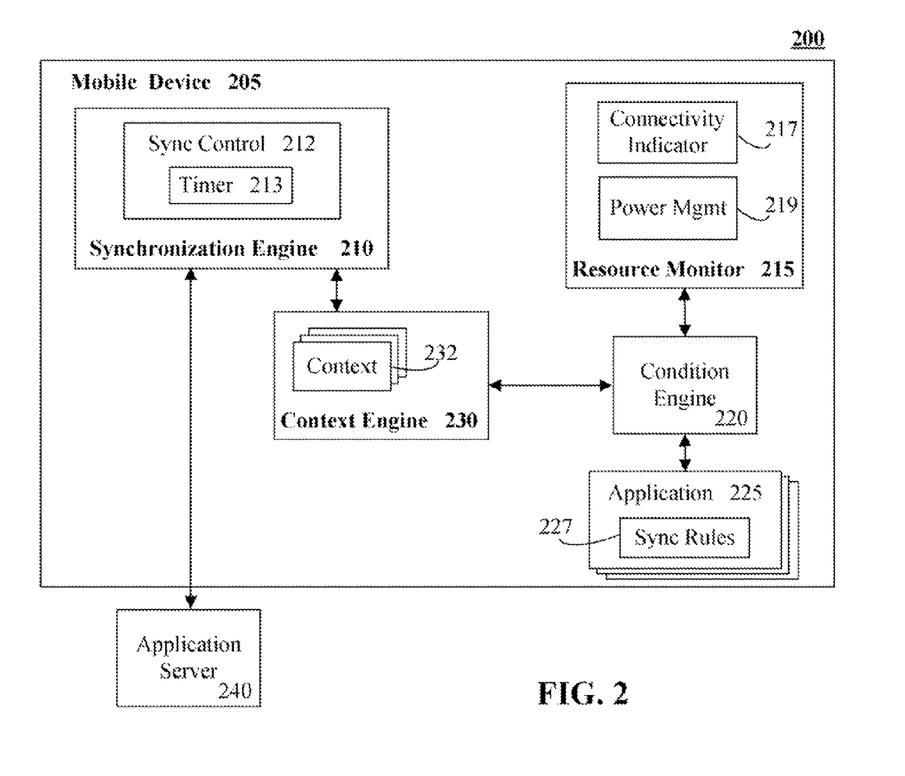
FIG. 2 is a schematic diagram illustrating a mobile device having context-based data synchronization capabilities in accordance with an embodiment of the inventive arrangements disclosed herein.

FIG. 2 is schematic diagram illustrating a system 200 that includes a mobile device 205 having context-based data synchronization capabilities in accordance with an embodiment of the inventive arrangements disclosed herein. System 200 can be performed in the context of system 100.

In system 200, the resource monitor 215 can determine a current state for mobile device 205 resources. The resource information can be sent to condition engine 220, which manages all device synchronization conditions. One or more applications 225 can also convey information to the condition engine 220, to provide the requisite information to permit the condition engine 220 to handle application based synchronization conditions.

The context engine 230 can establish one or more contexts 232, each context 232 having an associated set of synchronization settings, which can be user defined. Additionally, each context 232 can have combinatory logic, which is applied to the set of synchronization settings. Each synchronization setting can be compared against a corresponding condition, determined by the condition engine 220. The combinatory logic can include mathematical operators, such as a union operator, an intersection operator, and a complementation operator. Results from the combinatory logic can determine which of multiple synchronization actions are to be performed and can determine performance conditions. Performance conditions can include a time within which a synchronization is to occur. For example, the context engine 230 can determine that a synchronization to acquire new email is to be performed within the next five minutes.

The context engine 230 can convey synchronization details, which include needed synchronization actions and performance conditions, to the synchronization engine 210. The synchronization engine 210 can synchronize device 205 and application server 240. Synchronization engine 210 can include sync control 212. Sync control 212 can initiate synchronization actions with application server 240 based on the input from context engine 230 and timer 213 settings.

Resource monitor 215 can represent the mechanism for generating numeric values corresponding to the resources of mobile device 205. Resource monitor 215 can contain connectivity indicator 217 and power management module 219. Connectivity indicator 217 can provide resource monitor 215 with information regarding the transceiver that is currently active for mobile device 205. Power management module 219 can provide resource monitor 215 with information pertaining to the current amount of power available to mobile device 205.

Application 225 can represent software that can run on mobile device 205. Application 225 can contain sync rules 227 and can send synchronization requests to condition engine 220. Sync rules 227 can represent synchronization settings inherent to application 225. The settings of sync rules 227 can be overridden by the synchronization settings used by context engine 230.

Interaction among the components of system 200 can be clarified through an example as follows. It should be appreciated that the following example is for illustrative purposes only and that the invention should not be construed as limited to the specific arrangements used within. In the example, application 225 can synchronize data with application server 240. Application 225 can send a synchronization request to condition engine 220. The synchronization request can be treated as a synchronization condition. In turn, condition engine 220 can gather values for the current conditions of mobile device 205, which can include device resource levels from resource monitor 215. Condition engine 220 can then pass the collected data to context engine 230. Context engine 230 can evaluate context 232 using the condition values from condition engine 220. The evaluation of context 232 can result in permitting the synchronization action, which is communicated to synchronization engine 210. The synchronization action can be initiated immediately or within a specific time constraint (e.g., within 30 minutes). A delayed synchronization can initiate timer 213 of sync control 212. A synchronization action can occur when the timer exceeds or reaches a threshold established by an associated synchronization context.

Figure 3:
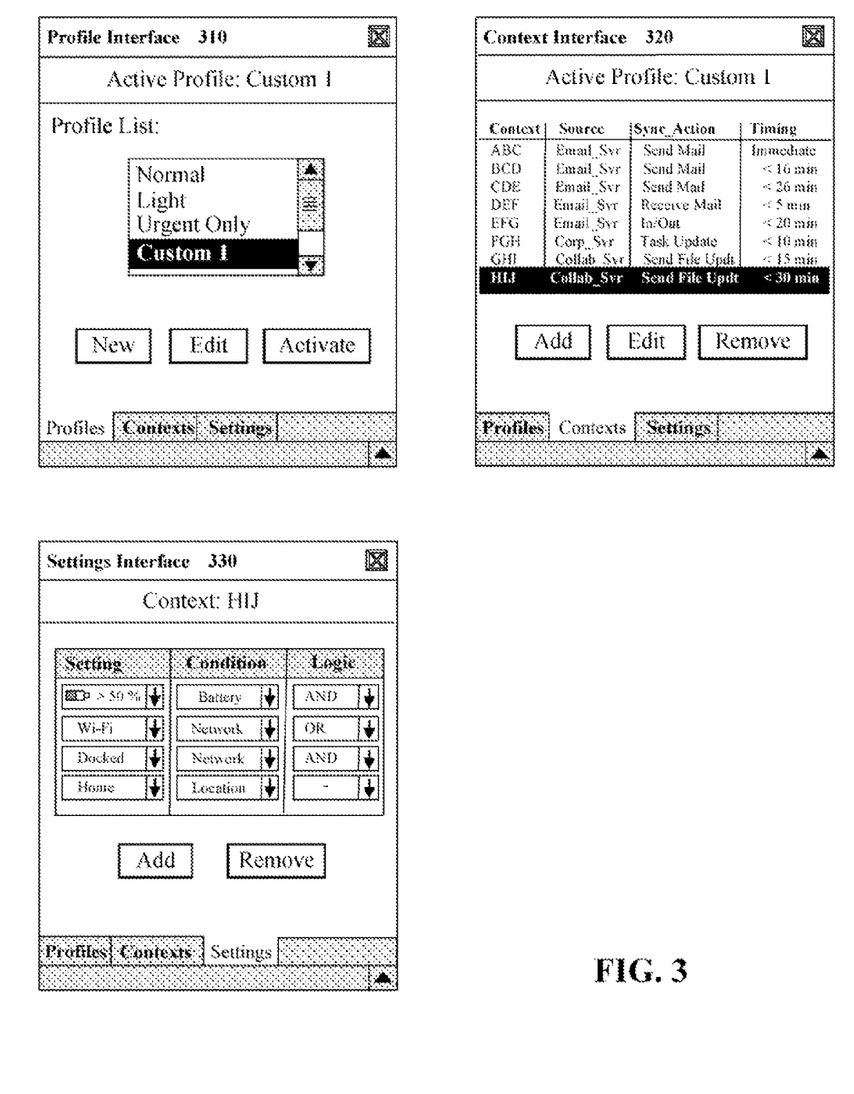
FIG. 3 shows a set of Graphical User Interfaces (GUIs) that can be used to establish synchronization settings in accordance with an embodiment of the inventive arrangements disclosed herein.

FIG. 3 shows a set of Graphical User Interfaces (GUIs) 310-330 that can be used to establish synchronization settings in accordance with an embodiment of the inventive arrangements disclosed herein. The GUIs 310-330 can be used in the context of a system 100 and/or a system 200.

GUI 310 is an interface for selecting a synchronization profile, which is a collection of defined synchronization contexts. For example, profiles can include preconfigured profiles, such as profiles for normal, light, and urgent only synchronizations. Each of these profiles can be edited and/or activated. Only one profile can be active for a mobile device at any one time. Further, users can add new profiles, such as the illustrated profile called "Custom 1."

In one contemplated embodiment, profiles can be associated with activation conditions (not shown) that permit profiles to be changed responsive to device events. For example, one profile appropriate for work can be automatically activated Monday-Friday from 9:00 AM to 5:00 PM. A different profile appropriate for recreation can be automatically activated on weekends.

GUI 320 shows an interface for viewing, editing, and adding synchronization contexts. The displayed contexts can be associated with a synchronization profile. Multiple contexts can be simultaneously active. Contexts can be triggered when associated combinatory logic is evaluated as TRUE. The combinatory logic can include multiple comparisons between synchronization settings and synchronization conditions. GUI 320 control can permit contexts to be edited and can permit contexts to be added or removed from a profile.

Each context can have an associated identity, a synchronization data source, a synchronization action, and a timing parameter. The synchronization data source can identify digital content and a content source which is to synchronize with the mobile device. The synchronization action can provide specifics regarding how content is to be synchronized. The timing parameter can specify whether synchronization is to occur immediately or within a designated period. Permitting synchronization time windows can allow a mobile device to perform multiple synchronization actions whenever a network connection is established, which can conserve mobile device resources.

As shown, contexts ABC, BCD, CDE, DEF, and EFG all synchronize the mobile device with an email server. Contexts ABC, BCD, CDE send email. Context DEF receives email. Context EFG sends and receives email. The timing conditions for synchronization can vary for each of the email related contexts ABC, BCD, CDE, DEF, and EFG. Because each of the contexts can be evaluated by comparing different settings against different conditions using context specific logic, similar actions can be performed by multiple contexts, as shown by context ABC, BCD, and CDE. That is, the device conditions that cause context ABC, BCD, and CDE to each evaluate as TRUE or FALSE vary from one another.

GUI 330 shows an interface for applying settings and combinatory logic to a context. Multiple different synchronization settings, which can include user defined settings and values can be compared against current device conditions. Logic operators can be applied to the comparisons. The GUI 330 can include elements for adding new comparisons (of settings and conditions) and for removing existing comparisons.

As shown, context HIJ evaluates a TRUE when a battery level is currently greater than fifty percent, a mobile device is located at home, and when the mobile device is connected to a network by being docked or through a Wi-Fi transceiver. A user can change values for the settings, conditions, and logic for any synchronization context, which is illustrated in GUI 330 by the pull-down selection GUI elements.

Figure 4:
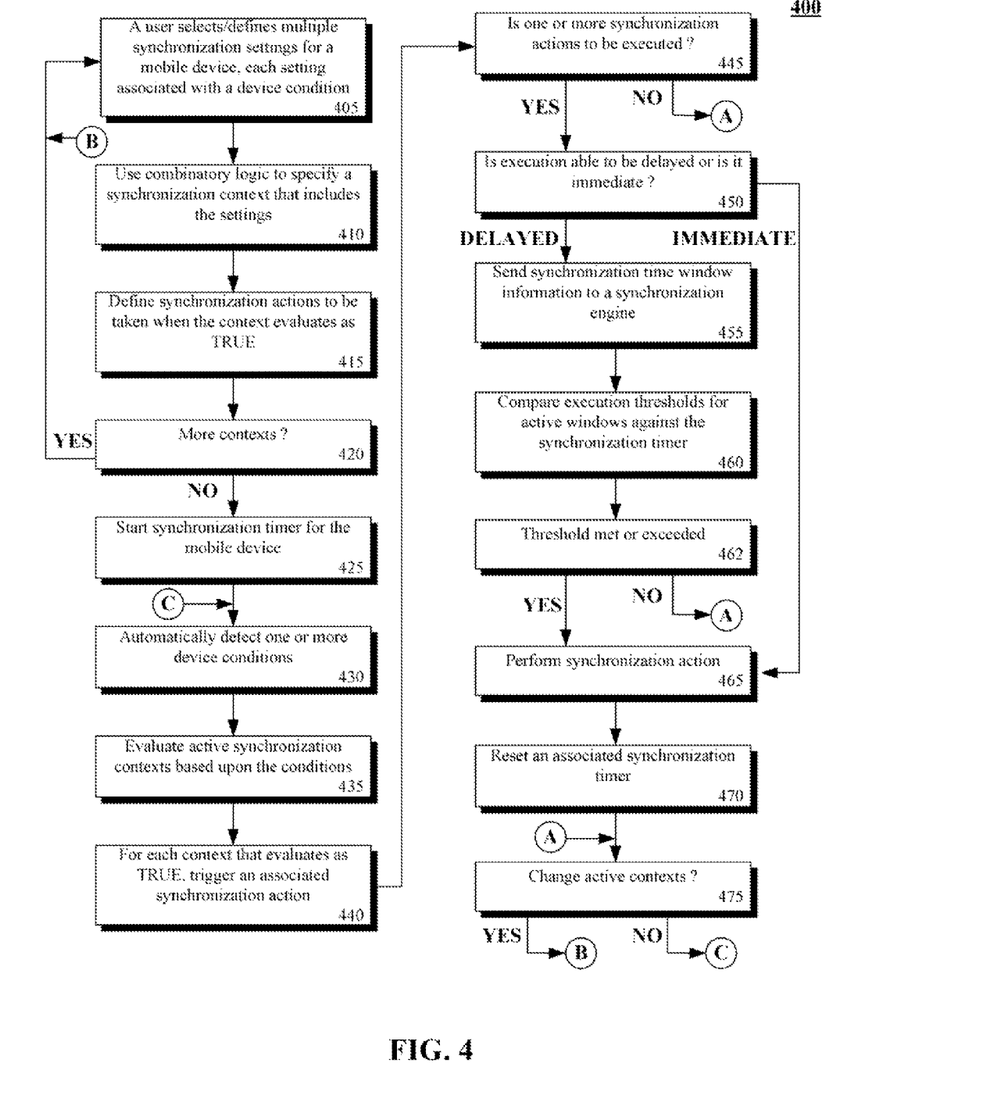
FIG. 4 is a flow chart of a method in which a mobile device performs context-based synchronizations in accordance with an embodiment of the inventive arrangements disclosed herein.

FIG. 4 is a flow chart of a method 400 in which a mobile device performs context-based synchronizations in accordance with an embodiment of the inventive arrangements disclosed herein. The method 400 can be performed in the context of a system 100 or system 200.

Method 400 can begin in step 405, where a user can select or define multiple synchronization settings for a mobile device. Each setting can be associated with a device condition. In step 410, combinatory logic can be used to specify a synchronization context that includes the settings. In step 415, a synchronization action can be defined for the context. The synchronization action is to be taken when the context evaluates as TRUE. In step 420, additional contexts can be defined for the mobile device. Multiple contexts, each having their own evaluation logic and associated synchronization actions, can be defined. If more contexts are to be defined, the method can loop to from step 420 to step 405, where settings for the next context can be established.

Once all contexts are defined, the method can proceed to step 425, where a synchronization timer can be started for the mobile device. The synchronization timer can mark a time since an associated synchronization action last occurred. Different synchronization actions can be conducted with different data sources. Each of the types of actions can be associated with its own synchronization timer.

In step 430, one or more device condition can be automatically detected. In step 435, active synchronization contexts can be evaluated based upon the detected condition values. In step 440, for each context that evaluates as TRUE, an associated synchronization action is triggered. Triggering a synchronization action can cause the action to be executed immediately or can cause the action to be executed within a designated time window. In step 445, a determination can be made as to whether one or more synchronization actions have been triggered. If not, the method can skip to step 475, where a user is able to add, remove, or edit an active context.

If at least one synchronization action has been triggered, the method can proceed from step 445 to step 450, where a determination can be made as to whether an execution of the synchronization action is immediate or delayed. If immediate, the method can progress from step 450 to step 465, where the action can be executed. If delayed, the method can continue at step 455, where synchronization time window information for the action can be conveyed to a synchronization engine. The time window, for example, can specify that the defined synchronization action is to be performed within the next five minutes.

In step 460, execution thresholds for delayed synchronization actions can be compared against corresponding synchronization timers. In step 462, when a threshold is met or exceeded, the associated synchronization action can execute, which is shown by step 465. When no threshold is reached or exceeded, the method can proceed from step 462 to 475, where a user can optionally modify a synchronization context.

After a synchronization action is performed (step 465), the method can proceed to step 470, where a synchronization timer corresponding to the performed action can be reset. In step 475, a user can optionally change a current context. If a context is changed, the method can progress to step 405, where a user can modify synchronization settings, combinatory logic, and/or defined synchronization actions. If no change is made to a context, the method can proceed from step 475 to step 430, where mobile device conditions can be detected.

Figure 5:
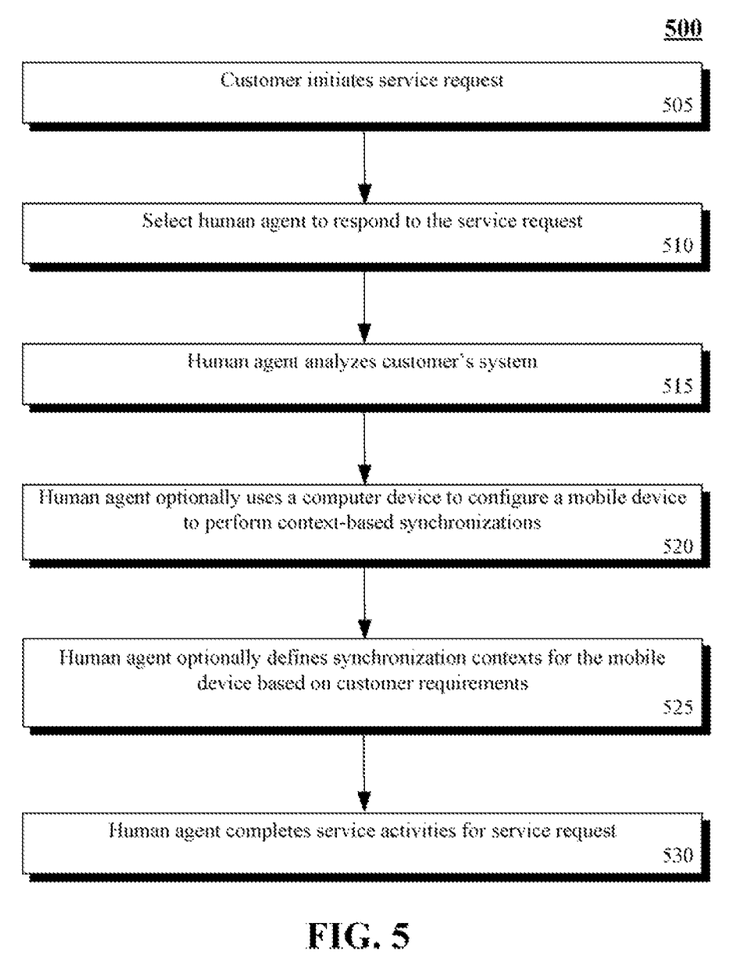
FIG. 5 is a flow chart of a method where a service agent can configure a system to perform context-based data synchronization with a mobile device in accordance with an embodiment of the inventive arrangements disclosed herein.

FIG. 5 is a flow chart of a method 500 where a service agent can configure a system to perform context-based data synchronization with a mobile device in accordance with an embodiment of the inventive arrangements disclosed herein. Method 500 can be performed in the context of systems 100, 200, and/or method 400.

Method 500 can begin in step 505, when a customer initiates a service request. The service request can be a request for a service agent to establish a new system for context-based data synchronization with a mobile device. The service request can also be a request to troubleshoot a problem with an existing system for context-based data synchronization with a mobile device.

In step 510, a human agent can be selected to respond to the service request. In step 515, the human agent can analyze a customer's current system and can develop a solution. The solution can result in system 100 or any system where a mobile device can be configured to perform context-based data synchronization, such as a system that performs the steps of method 400.

In step 520, the human agent can configure the customer's system to perform context-based data synchronization with a mobile device. This can include the installation of a synchronization engine, context engine, condition engine, and resource monitor on the mobile device. In step 525, the human agent can optionally define synchronization contexts for a configured mobile device for the customer. The human agent can perform steps 520 and 525 and/or can configure a computing device of the customer in a manner that the customer or clients of the customer can perform steps 520 and 525 using the configured system in the future. For example, the service agent can load and configure software and hardware so that client devices will be capable of performing context-based data synchronization. In step 530, the human agent can complete the service activities.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for a mobile device to synchronize data comprising:
   permitting users via a graphical user interface to define a plurality of different custom contexts independent of a plurality of applications of the mobile device, wherein each custom context is able to be evaluated by a context engine of the mobile device as being true or false, wherein each custom context permits a user to establish via the graphical user interface a plurality of different dynamic conditions of the mobile device and user configurable thresholds for the dynamic conditions;
   associating via the graphical user interface each custom context with a user selected synchronization action, wherein the synchronization actions apply to any of the plurality of applications of the mobile device;
   a resource monitor continuously monitoring values of the dynamic conditions of the mobile device;
   a context engine running on the mobile device continuously evaluating the custom contexts utilizing the values of the dynamic conditions provided by the resource monitor;
   whenever any custom context evaluates as TRUE, the mobile device triggering the associated set of synchronization actions, wherein at least one of the set of synchronization actions are application-specific actions to be taken by a specific one of the plurality of applications executing upon the mobile device, wherein application specific synchronization rules are overridden by those established by the custom contexts and associated with synchronization actions; and
   wherein the context engine, a synchronization engine, and the resource monitor are computer program products that are stored in a tangible medium executing on hardware of the mobile device and that are implemented independent of any of the plurality of applications of the mobile device.

2. The method of claim 1, wherein for each custom context, the user is further able to specify via the graphical user interface combinatory logic for evaluating the set of dynamic conditions and user configurable thresholds in combination with each other, said combinatory logic comprising at least an "AND" and an "OR" operator, and wherein at least a portion of the dynamic conditions established for the custom contexts comprise application specific conditions and application independent resource consumption conditions of mobile device resources, wherein said application specific conditions are usage conditions specific to different ones of a plurality of application of the mobile device, wherein said application independent resource consumption conditions indicate a state of a physical component of the mobile device or a physical location of the mobile device.

3. The method of claim 1, wherein the dynamic conditions are associated with at least one of a resource level for a resource of the mobile device and an environmental condition of an external environment in which the mobile device is located, wherein the mobile device is configured to automatically detect the environmental condition.

4. The method of claim 1, wherein the dynamic conditions include a power source type, a battery level, a network connection type, a level of available bandwidth, a CPU load, a service cost associated with the synchronization action, and a geographic location of the mobile device.

5. The method of claim 1, wherein the method permits the synchronization of plurality of applications of the mobile device to be centrally and consistently handled via the graphical user interface even when at least some of the applications lack application-specific synchronization control capabilities, wherein a plurality of standard contexts are established for the device, each context being associated with a plurality of standard settings and setting values, wherein user selected ones of the plurality of contexts are selectively active for the mobile device.

6. The method of claim 1, wherein the synchronization action comprise: an action to send email from the mobile device, an action to receive email to the mobile device, and an action to synchronize a specific document being used by an application executing on the mobile device with an external data source etc.

7. The method of claim 1, further comprising:
   defining via the graphical user interface a plurality of different synchronization profiles, each synchronization profile including a plurality of profile specific custom contexts associated with it, wherein different ones of the synchronization profiles can be dynamically activated and deactivated for the mobile device in accordance with user established settings.

8. The method of claim 1, wherein the method utilizes a framework that is independent of any particular synchronization application or device, and wherein the graphical user interface permits server-specific synchronization actions to be associated with any of the different custom contexts, wherein a plurality of different servers are able to be synchronized with the mobile device via the graphical user interface, said method further comprising:
    evaluating the combinatory logic of each active one of the custom contexts; and
    determining whether to automatically initiate a synchronization action based upon the results of the evaluating step.

9. The method of claim 1, further comprising:
    intercepting an attempted application-specific synchronization action fired by one of the plurality of applications executing upon the mobile device;
    considering the attempted application-specific synchronization action as one of the different dynamic conditions of one of the custom contexts; and
    executing the attempted application-specific synchronization action only when the custom context evaluates as TRUE.

10. The method of claim 1, further comprising:
    permitting specific levels of shared resources of the mobile device to be reserved by applications executing upon the mobile device, wherein the levels of shared resources reserved by the applications are one of the dynamic conditions for determining whether the synchronization context evaluates as TRUE.

11. The method of claim 2, wherein said steps of claim 1 are steps performed automatically by at least one machine in accordance with at least one computer program having a plurality of code sections that are executable by the at least one machine, and wherein at least one of the application specific conditions comprise a condition triggered by a user attempt to access a collaborative document from within one of the plurality of applications executing upon the mobile device.

12. The method of claim 1, wherein for each associated synchronization action, a user can configure via the graphical user interface timing for the synchronization action in relationship to a time at which the associated context evaluated as TRUE, wherein triggering of the synchronization action causes the synchronization action to execute within a user designated time window, wherein use of the designed time windows as opposed to forcing immediate execution or execution at a specific time permits multiple synchronization actions to be performed concurrently to conserve mobile device resources.

13. A mobile device comprising:
    a data store;
    a user interface configured to permit a user to establish a plurality of different contexts independent of a plurality of applications on the mobile device, each context is able to be evaluated by a context engine of the mobile device as being true or false, wherein each context permits a user to establish via the user interface a plurality of different dynamic conditions of the mobile device and user configurable thresholds for the dynamic conditions, wherein the user interface permits a user to associate each custom context with a user selected synchronization action, wherein the synchronization actions apply to any of the plurality of applications of the mobile device, wherein at least a portion of the dynamic conditions established for the custom contexts comprise application specific conditions and application independent resource consumption conditions of mobile device resources, wherein said application specific conditions are usage conditions specific to different ones of a plurality of application of the mobile device, wherein said application independent resource consumption conditions indicate a state of a physical component of the mobile device or a physical location of the mobile device;
    a resource monitor configured to continuously monitor values of the dynamic conditions of the mobile device;
    a condition engine configured to intercept an attempted application-specific synchronization actions fired by at least one of the plurality of applications executing upon the mobile device;
    a context engine running on the mobile device configured to continuously evaluate the context utilizing the values of the dynamic conditions provided by the resource monitor, wherein the attempted application-specific synchronization action is considered as one of the dynamic conditions; and
    a synchronization engine configured to automatically and selectively synchronize the mobile device responsive to results of the comparisons between the condition values and synchronization settings, wherein whenever any context evaluates as TRUE, the synchronization engine triggers the associated set of synchronization actions, wherein the context engine, the synchronization engine, the condition engine and the resource monitor are implemented independent of any of the plurality of applications of the mobile device.

14. The mobile device of claim 13, wherein the user interface is a graphical user interface of the mobile device, and wherein at least one of the set of synchronization actions are application-specific actions to be taken by a specific one of the plurality of applications executing upon the mobile device.

15. The mobile device of claim 13, further wherein the context engine evaluates combinatory logic that related the plurality of condition values, wherein the result of the evaluation determines whether to automatically synchronize the mobile device, wherein triggering of the synchronization action causes the synchronization action to execute within a user designated time window, wherein use of the designed time windows as opposed to forcing immediate execution or execution at a specific time permits multiple synchronization actions to be performed concurrently to conserve mobile device resources.

16. The mobile device of claim 13, wherein application specific synchronization rules are overridden by those established by the contexts and that are associated with synchronization actions.

17. The mobile device of claim 13, wherein said synchronization engine handles synchronization for a plurality of different applications, and wherein at least a portion of the different applications lack an application specific mechanism to control synchronization of application data.

18. A computer program product for a mobile device to synchronize data the computer program product comprising:
    a non-transitory computer usable storage having computer usable program code embodied therewith, the computer usable program code comprising:
    computer usable program code operable to permit users via a graphical user interface to define a plurality of different custom contexts independent of a plurality of application on the mobile device, wherein each custom context is able to be evaluated by a context engine of the mobile device as being true or false, wherein each custom context permits a user to establish via the graphical user interface a plurality of different dynamic conditions of the mobile device and user configurable thresholds for the dynamic conditions, wherein at least a portion of the dynamic conditions established for the custom contexts comprise application specific conditions and application independent resource consumption conditions of mobile device resources, wherein said application specific conditions are usage conditions specific to different ones of the plurality of application of the mobile device, wherein said application independent resource consumption conditions indicate a state of a physical component of the mobile device or a physical location of the mobile device;

computer usable program code operable to associate via the graphical user interface each custom context with a user selected synchronization action, wherein the synchronization actions apply to any of a plurality of applications of the mobile device, wherein the graphical user interface permits the user to associate, with at least one custom context, only a portion of synchronization actions performed by any one of the plurality of applications of the mobile device;

computer usable program code operable to, via a resource monitor, continuously monitor values of the dynamic conditions the mobile device;

computer usable program code operable to, via a context engine running on the mobile device, continuously evaluate the custom context utilizing the values of the dynamic conditions provided by the resource monitor;

computer usable program code operable to whenever any custom context evaluates as TRUE, trigger the associated set of synchronization actions, wherein the context engine, the synchronization engine, wherein at least one of the set of synchronization actions are application-specific actions to be taken by a specific one of the plurality of applications executing upon the mobile device; and wherein, the context engine, the synchronization engine, and the resource monitor are computer program products that are stored in a tangible medium executing on hardware of the mobile device and that are implemented independent of any of the plurality of applications of the mobile device.

19. The computer program product of claim 18, wherein the user is further able to specify via the graphical user interface combinatory logic for evaluating the set of dynamic conditions and user configurable thresholds in combination with each other, said combinatory logic comprising at least an "AND" and an "OR" operator, said computer program product further comprising:

computer usable program code operable to intercept an attempted application-specific synchronization action fired by one of the plurality of applications executing upon the mobile device, considering the attempted application-specific synchronization action one of the different dynamic conditions of one of the custom contexts, executing the attempted application-specific synchronization action only when the custom context evaluates as TRUE.

* * * * *